United States Patent [19]

Hashimoto et al.

[11] Patent Number: 4,594,182
[45] Date of Patent: Jun. 10, 1986

[54] INDIUM TIN OXIDE SOL COMPOSITION

[75] Inventors: Tadanori Hashimoto; Hiroshi Yoshitake; Hiroyuki Yokoyama; Akiko Nakazono, all of Osaka, Japan

[73] Assignee: Sumitomo Chemical Company, Ltd., Osaka, Japan

[21] Appl. No.: 614,929

[22] Filed: May 29, 1984

[30] Foreign Application Priority Data

May 27, 1983 [JP] Japan ................... 58-94472
May 27, 1983 [JP] Japan ................... 58-94473
May 27, 1983 [JP] Japan ................... 58-94474

[51] Int. Cl.[4] ................... B01J 13/00; H01B 1/08
[52] U.S. Cl. ................... 252/518; 106/1.22; 252/309; 252/313.1
[58] Field of Search ................... 252/313.1, 518, 309; 106/1.22

[56] References Cited

U.S. PATENT DOCUMENTS

Re. 23,556  9/1952  Mochel ................... 252/518 X
2,438,230  3/1948  Ryznar ................... 252/313.1
2,696,474  12/1954  Heard ................... 252/313.1 X
3,767,590  10/1973  Kenney ................... 252/313.1
3,949,121  4/1976  Kenney ................... 427/98

FOREIGN PATENT DOCUMENTS 2458508  6/1975  Fed. Rep. of Germany .

OTHER PUBLICATIONS

Encyclopedia Chemica, 5, published by Kyoritsu Shuppan, p. 544.
Noguchi et al.: "Electrical Properties of Undoped $In_2O_3$ Films Prepared by Reactive Evaporation", J. Phys. D: Appl. Phys., 13: pp. 1129-1133 (1980).
Manifacier et al.: "Deposition of $In_2O_3$—$SnO_2$ Layers on Glass Substrates using a Spraying Method", Thin Solid Films, 77, pp. 67-80 (1981).
Tsunashima, Atsumu et al.: "Preparation of Tin-Doped Indium Oxide Thin Films by Thermal Decomposition of Metal Octanoates", Chemistry Letters, pp. 855-856 (1978).

Primary Examiner—Richard D. Lovering
Attorney, Agent, or Firm—Sughrue, Mion, Zinn, Macpeak, and Seas

[57] ABSTRACT

An indium tin oxide sol composition comprising about 0.5 to about 30% by weight of indium oxide, tin oxide in an amount of about 0.5 to about 30% by weight, as converted to a basis of tin, based on indium in the indium oxide, and a dispersing agent, which sol composition is obtained by contacting a solution of an indium salt of an inorganic acid containing a tin salt of an inorganic acid with an ion-exchange resin is disclosed. The indium tin oxide sol composition has a high purity and forms an excellent transparent conductive film.

7 Claims, No Drawings

INDIUM TIN OXIDE SOL COMPOSITION

FIELD OF THE INVENTION

This invention relates to an indium tin oxide sol composition and a process for producing the same. More particularly, this invention relates to an indium tin oxide sol composition having a high purity and providing an excellent transparent conductive film.

BACKGROUND OF THE INVENTION

Electrode materials which are transparent to light have been widely used for electrodes in display devices, such as liquid crystal display devices, electroluminescense, etc., and photosensitive devices, such as photocells, image pick-up tubes, etc., as well as anti-clouding or anti-freezing electrodes for window glass of automobiles, aeroplanes, buildings and the like.

As such transparent electrode materials, a tin oxide-antimony oxide type, an indium oxide-tin oxide type and the like are well known. These metal oxides can form a film on a glass or ceramic plate to provide a transparent conductive film.

The well-known methods for forming a transparent conductive film includes (1) a vacuum evaporation method, (2) a sputtering method, (3) a CVD method, and (4) a coating method.

However, each of the above-described methods (1), (2) and (3) has problems in that: equipments used therefor are so complicated that these methods are inferior in processability; and in the usual case, etching must be carried out after film formation in order to form patterns.

The above-described method (4) offers a possibility of solving the aforesaid problems associated with the methods (1) to (3), but there still is a problem that it is difficult to obtain a transparent conductive thin film which can withstand practical use.

Methods which have been proposed for effecting the above method (4) include a method of using solutions of inorganic salts, e.g., $InCl_3$, $In(NO_3)_3$, $SnCl_4$, etc., in organic solvents, a method of using indium salts of organic acids having a strong ionic bond, such as indium octylate, etc., a method of using organic complexes of indium or tin, and the like. These methods, however, involve disadvantages such as hindering of homogenization of the film or gellation of the coating composition upon thermal decomposition of the coated film formed on the substrate plate, thus causing non-uniformity or turbidity of the film or insufficient mechanical strength to easily get scratches.

It is hitherto known that an indium oxide composition is produced by liquid phase neutralization of an inorganic indium salt with an alkaline substance, such as sodium hydroxide or aqueous ammonia, as disclosed in West Germany Patent Publication (OLS) No. 2,458,508. However, the indium oxide composition produced by the above-described known method contains salts as by-products, e.g., $NaCl$, $NaNO_3$, $NH_4Cl$, $NH_4NO_3$, etc., and such salts prevent the film from homogenization when the composition is coated on a substrate plate such as glass and then heat-baked or the by-produced salts remain in the film after baking.

SUMMARY OF THE INVENTION

Accordingly, an object of the present invention is to provide a novel indium tin oxide sol composition and a method for producing the same.

Another object of the present invention is to provide a novel indium tin oxide sol composition which does not contain salts as by-products and has a high purity and a method for producing the same.

Still another object of the present invention is to provide an indium tin oxide sol composition which is capable of forming an excellent transparent conductive film having a uniform and smooth surface.

The above objects of the present invention can be accomplished by an indium tin oxide sol composition comprising about 0.5 to about 30% by weight of indium oxide, tin oxide in an amount of about 0.5 to about 30% by weight, as converted to a basis of tin, based on indium in the indium oxide, and a dispersing agent, which sol composition is obtained by contacting a solution of an indium salt of an inorganic acid containing a tin salt of an inorganic acid with an ion-exchange resin.

DETAILED DESCRIPTION OF THE INVENTION

Dispersing agents which can be used for the sol composition of the present invention include water and organic solvents. The organic solvents are not particularly limited but preferably include tetrahydrofuran, acetone, methanol, ethanol, ethylene glycol, methyl Cellosolve, ethyl Cellosolve and the like. These organic solvents preferably contain a thickening agent such as methyl cellulose, ethyl cellulose, nitrocellulose and the like. These dispersing agents can be used alone or in combination of two or more of them.

These dispersing agents can properly be selected depending on the use of the sol composition, taking into account dispersibility, viscosity, etc.

In order to ensure stability of the sol with the passage of time, it is effective in some cases to add a straight chain, saturated fatty acid having 1 to 18 carbon atoms, preferably 1 to 6 carbon atoms, more particularly acetic acid, to the system in an amount of about 0.001 to about 10% by weight based on the composition.

The above-described straight chain, saturated fatty acid having 1 to 18 carbon atoms that can be used if desired is usually added to the solution of the inorganic indium salt, but may also be added to the composition after contacting with an ion-exchange resin.

Solvents which can be used in the production of the sol composition according to the present invention usually include water, an organic solvent and a mixture thereof. The organic solvent is not particularly limited, but preferably includes tetrahydrofuran, acetone, methanol, ethanol, ethylene glycol, methyl Cellosolve, ethyl Cellosolve and the like. These solvents can be selected taking into account the solubility of the indium salt of an inorganic acid and the tin salt of an inorganic acid as well as the dispersibility and viscosity of the formed sol, and the like.

The indium salt of an inorganic acid that can be used in the present invention is generally an indium salt of a mineral acid, preferably indium chloride or indium nitrate. The indium salt of an inorganic acid may be a hydrate. The solution of the indium salt of an inorganic acid preferably contains the indium salt of an inorganic acid in an amount of about 0.5 to about 30% by weight, particularly 1 to 10% by weight, as converted to a basis of $In_2O_3$.

The tin salt of an inorganic acid that can be used in the present invention preferably includes a tin salt of a mineral acid, particularly stannic chloride. The inorganic tin salt is added to the solution of the indium salt of an inorganic acid in an amount of about 0.5 to about 30% by weight, preferably 1 to 20% by weight, as converted to a basis of tin, based on indium in the inorganic indium salt.

The solution of the indium salt of an inorganic acid may further contain a mineral acid, preferably hydrochloric acid or nitric acid, in order to improve the solubility of the indium salt of an inorganic acid and tin salt of an inorganic acid. Such a mineral acid is preferably added at a concentration of about 0.01 to about 10% by weight in the solution of the indium salt of an inorganic acid.

The ion-exchange resin that can be effectively used in the present invention includes an anion-exchange resin containing, as an exchanging group, any of a primary amino, a secondary amino, a tertiary amino and a quaternary ammonium group. In particular, medium or weakly basic ion-exchange resins having a tertiary amino group or a quaternary ammonium group as an exchange group are preferred. The resin matrix for these ion-exchange resins is not particularly restricted and usually includes a polystyrene resin, an epoxypolyamine resin, a phenol resin, a polyacrylic resin, a polyvinyl resin and the like.

Contacting between the inorganic indium salt solution and the ion-exchange resin can be carried out under properly selected conditions. For example, it is generally carried out by a method in which the ion-exchange resin is dipped in the solution of an indium salt of an inorganic acid, or a method in which the solution of an indium salt of an inorganic acid is passed through a column packed with the ion-exchange resin.

In carrying out the present invention, the amount of the ion-exchange resin to be used is not particularly limited, and varies depending on the composition of the solution of an indium salt of an inorganic acid, the kind of the ion-exchange resin, etc., and, therefore, can be determined by preliminary studies.

The temperature at which the solution of an indium salt of an inorganic acid and the ion-exchange resin are brought into contact is not particularly limited, but usually ranges from about 0° to about 50° C.

The contact time is not also particularly limited and can appropriately be selected depending upon the composition of the solution of an indium salt of an inorganic acid, the kind of the ion-exchange resin and the like.

In addition, for the purpose of improving dispersibility, viscosity, etc. of the sol, a proper dispersing agent can be advantageously added, if necessary, to the solution of the indium salt of an inorganic acid which has been contacted with the ion-exchange resin.

By the above-described method according to the present invention, there can be obtained a transparent to semi-transparent, milky white indium tin oxide sol composition containing about 0.5 to about 30% by weight of indium oxide and about 0.5 to about 30% by weight, as converted to a basis of tin, of tin oxide based on indium in the indium oxide.

The thus obtained indium tin oxide sol composition is of high purity, containing no by-produced salts. Even when the composition is allowed to stand for 2 months, it undergoes neither agglomeration of particles nor increase in viscosity, showing its excellent stability with the lapse of time.

The method for forming a transparent conductive film on a substrate plate using the indium tin oxide sol composition of the present invention will be described below.

The substrate plate which can be used in the present invention generally includes glass, ceramic, etc. as well as any substrate plate that has been commonly employed for the formation of transparent conductive films.

Coating of the indium tin oxide sol composition of the present invention can be carried out by commonly employed coating techniques, such as dipping, spinning, screen printing, etc.

The amount of the sol composition to be coated varies depending upon the viscosity of the sol, the content of indium oxide and the requisite film thickness, but is generally adjusted so that the film formed has a thickness of from several hundred to several thousand angstroms.

The thus coated sol composition is generally subjected to a drying treatment at about 40° to 250° C. and then to a baking treatment at about 350° to 900° C., thereby to form a transparent conductive film. The baking can be performed in an oxygen-containing gas atmosphere, an inert gas atmosphere, e.g., a nitrogen atmosphere, or a hydrogen atmosphere.

With respect to a baking temperature, a conductive film may be formed at a relatively low temperature, e.g., 350° C., but the higher the baking temperature, the higher conductivity the resulting film has, to produce a film excellent in transparency and adhesiveness to the substrate plate. Therefore, it is desirable to conduct the baking treatment at a temperature as high as possible taking into account thermal resistance of the substrate plate used.

The longer the baking time, the better the results that can be obtained, but 30 to 60 minutes are preferred from the standpoint of workability.

Moreover, in accordance with the present invention, when it is particularly required to form a low-resistivity film, such a film can easily and effectively be obtained by repeatedly conducting coating, drying and baking thereby forming a multi-layered film.

The present invention will now be illustrated in greater detail with reference to Examples and Comparative Examples, but it should be understood that these examples are not limiting the present invention.

EXAMPLE 1

11 parts by weight of indium chloride ($InCl_3.4H_2O$) and 1.1 parts by weight of stannic chloride ($SnCl_4.3H_2O$) were dissolved in 88 parts by weight of water, and the solution was passed through a column packed with 200 parts by volume of a weakly basic anion-exchange resin having a tertiary amino group as an exchange group (a trade name: Duolite A-374, manufactured by Duolite International Corporation) at a space velocity of 30 $hr^{-1}$ to obtain an indium tin oxide sol.

The resulting sol was spin-coated on a well-cleaned quartz glass plate at a rate of 3,000 rpm, and the coated plate was dried in air at 150° C. for 30 minutes and then baked at 500° C. for 1 hour to obtain a transparent conductive film.

The composition of the sol as above prepared and the properties of the resulting film are shown in Table 1 below.

TABLE 1

| Sol Composition | | Property of Film | | | |
|---|---|---|---|---|---|
| $In_2O_3$ Content (wt %) | Sn/In Ratio (wt %) | Thickness (Å) | Transmittance (%) | Sheet Resistivity (KΩ/□) | Film Surface |
| 3.2 | 9.6 | 300 | 89 | 1.5 | uniform and smooth |

EXAMPLE 2

26 parts by weight of induim nitrate ($In(NO_3)_3.3H_2O$) and 2.2 parts by weight of stannic chloride ($SnCL_4.3H_2O$) were dissolved in 40 parts by weight of water, and 32 parts by weight of methanol was added to the solution. The resulting mixture was passed through a column packed with 400 parts by volume of the above-described Duolite A-374 at a space velocity of 20 $hr^{-1}$ to obtain an indium tin oxide sol.

The thus prepared sol was subjected to the same procedures as in Example 1 to form a transparent conductive film on a quartz glass substrate. The results are shown in Table 2.

EXAMPLE 3

22 parts by weight of indium chloride ($InCl_3.4H_2O$) and 2.2 parts by weight of stannic chloride ($SnCl_4.3H_2O$) were dissolved in 76 parts by weight of water containing 0.1 part by weight of acetic acid. The resulting solution was passed through a column packed with 400 parts by volume of a medium-basic anion-exchange resin having tertiary amino and quaternary ammonium groups as exchange groups (a trade name: Duolite A-340, manufactured by Duolite International Corporation) at a space velocity of 20 $hr^{-1}$ to obtain an indium tin oxide sol.

The resulting sol was subjected to the same procedures as described in Example 1 to form a transparent conductive film on a quartz glass substrate, and the results obtained are shown in Table 2.

EXAMPLE 4

33 parts by weight of indium chloride ($InCl_3.4H_2O$) and 3.3 parts by weight of stannic chloride ($SnCl_4.3H_2O$) were dissolved in 64 parts by weight of water containing 0.5 part by weight of acetic acid, and the solution was passed through a column packed with 600 parts by volume of the aforesaid Duolite A-340 at a space velocity of 10 $hr^{-1}$. To the thus treated composition was added 50 parts by weight of ethylene glycol, thereby to obtain an indium tin oxide sol.

The resulting sol was subjected to the same procedures as in Example 1 to form a transparent conductive film on a quartz glass substrate. The results obtained are shown in Table 2.

TABLE 2

| | Sol Composition | | Property of Film | | |
|---|---|---|---|---|---|
| Example No. | $In_2O_3$ Content (wt %) | Sn/In Ratio (wt %) | Thickness (Å) | Sheet Resistivity (KΩ/□) | Film Surface |
| 2 | 6.1 | 9.9 | 600 | 1.2 | uniform and smooth |
| 3 | 6.0 | 9.6 | 600 | 0.9 | uniform |
| 4 | 6.1 | 9.6 | 600 | 1.1 | and smooth uniform and smooth |

EXAMPLE 5

An indium tin oxide sol was prepared in the same manner as in Example 1. The same procedures of coating, drying and baking as in Example 1 were repeatedly carried out to form a multi-layered film. The results obtained are shown in Table 3.

TABLE 3

| Sol Composition | | | Property of Film | | |
|---|---|---|---|---|---|
| $In_2O_3$ Content (wt %) | Sn/In Ratio (wt %) | Time of Coating | Thickness (Å) | Transmittance (%) | Sheet Resistivity (KΩ/□) |
| 3.2 | 9.6 | 1 | 300 | 89 | 1.5 |
| " | " | 2 | 600 | 90 | 0.7 |
| " | " | 3 | 900 | 88 | 0.3 |

COMPARATIVE EXAMPLE 1

11 parts by weight of indium chloride ($InCl_3.4H_2O$) was dissolved in 89 parts by weight of water, and the solution was treated in the same manner as described in Example 1 to prepare an indium oxide sol containing no tin.

Further, the resulting sol was subjected to the same procedures as in Example 1 to form a film on a quartz glass substrate plate. The results are shown in Table 4.

COMPARATIVE EXAMPLE 2

11 parts by weight of indium chloride ($InCl_3.4H_2O$) and 1.1 parts by weight of stannic chloride ($SnCl_4.3H_2O$) were dissolved in 88 parts by weight of water, and the solution was neutralized in a liquid phase with a 8% aqueous ammonia to a pH of 3.5 to obtain an indium tin oxide sol.

The resulting sol was subjected to the same procedures as in Example 1 to form a transparent conductive film on a quartz glass substrate. The results obtained are shown in Table 4.

TABLE 4

| | Sol Composition | | Property of Film | | |
|---|---|---|---|---|---|
| Comparative Example No. | $In_2O_3$ Content (wt %) | Sn/In Ratio (wt %) | Thickness (Å) | Sheet Resistivity (KΩ/□) | Film Surface |
| 1 | 3.2 | 0 | 300 | 200 | uniform and smooth |
| 2 | 3.4 | 9.6 | 300 | 10 | non-uniform and dendroid |

As is apparent from the above-described Examples and Comparative Examples, the indium tin oxide sol composition according to the present invention is very useful as a coating composition for forming transparent conductive films.

While the invention has been described in detail and with reference to specific embodiments thereof, it will be apparent to one skilled in the art that various changes and modifications can be made therein without departing from the spirit and scope thereof.

What is claimed is:

1. An indium tin oxide sol composition for coating on a substrate to form a transparent conductive film comprising about 0.5 to about 30% by weight of indium oxide, tin oxide in an amount of about 0.5 to about 30% by weight, as converted to a basis of tin, based on indium in the indium oxide, in a dispersing medium, which sol composition is obtained by contacting a solution of an indium salt of an inorganic acid containing a tin salt of an inorganic acid with an ion-exchange resin.

2. An indium tin oxide sol composition as claimed in claim 1, wherein said indium salt of an inorganic acid is indium chloride or indium nitrate.

3. An indium tin oxide sol composition as claimed in claim 1, wherein said tin salt of an inorganic acid is stannic chloride.

4. An indium tin oxide sol composition as claimed in claim 1, wherein said ion-exchange resin is an anion-exchange resin having a primary amino group, a second amino group, a tertiary amino group or a quaternary ammonium group as an exchange group.

5. An indium tin oxide sol composition as claimed in claim 1, wherein said indium tin oxide sol composition further contains about 0.001 to about 10% by weight of a straight chain, saturated fatty acid having 1 to 18 carbon atoms.

6. An indium tin oxide sol composition as claimed in claim 5, wherein said fatty acid is acetic acid.

7. An indium-tin oxide sol composition as claimed in claim 1 wherein said dispersing medium is water, an organic solvent or a mixture thereof.

* * * * *